United States Patent [19]
Franklin

[11] 3,847,494
[45] Nov. 12, 1974

[54] COUPLING MECHANISM FOR TUBULAR ELEMENTS

[76] Inventor: Ernest Franklin, 9950 Durant Dr., Beverly Hills, Calif. 90212

[22] Filed: Sept. 30, 1971

[21] Appl. No.: 185,094

Related U.S. Application Data

[62] Division of Ser. No. 64,964, Aug. 19, 1970, Pat. No. 3,650,427.

[52] U.S. Cl. .............................. 403/345, 403/410
[51] Int. Cl. .............................................. F16b 7/00
[58] Field of Search ........... 215/13 R, 12 A; 220/15; 287/103 R; 403/345, 410

[56] References Cited
UNITED STATES PATENTS

| | | | |
|---|---|---|---|
| 2,076,549 | 4/1937 | Conner | 215/13 R |
| 2,895,636 | 7/1959 | Martin | 215/13 R |
| 3,156,279 | 11/1964 | Grebowiec | 215/13 R |
| 3,311,248 | 3/1967 | Marchant | 215/13 R |

*Primary Examiner*—Andrew V. Kundrat
*Attorney, Agent, or Firm*—Jackson & Jones Law Corporation

[57] ABSTRACT

A two piece coupling mechanism is disclosed comprising a first and second element. The first element is a cup-shaped member having a cylindrical wall and a bottom wall forming a compartment for receiving cosmetics or the like. The second element is also of a cup-shaped configuration having a cylindrical and bottom walls of slightly larger dimensions in order to extend over the first element in a spaced relationship to form an insulative thermal air pocket therebetween. The coupling means for uniting the two elements comprises a grooved annular collar formed on the periphery of the cylindrical wall of the first element for receiving a plurality of projections extending inwardly from the rim of the second element. A pair of tightly fitting frictionally interengaging tubular extensions are formed on the bottom walls of both elements in a coaxial relationship with respect to the cylindrical walls. The interengaging tubular extensions function to absorb any bending or axial loads applied to the two elements and to increase the frictional interengagement therebetween upon the application of the loads in order to prevent the two elements from being separated.

4 Claims, 4 Drawing Figures

PATENTED NOV 12 1974 3,847,494
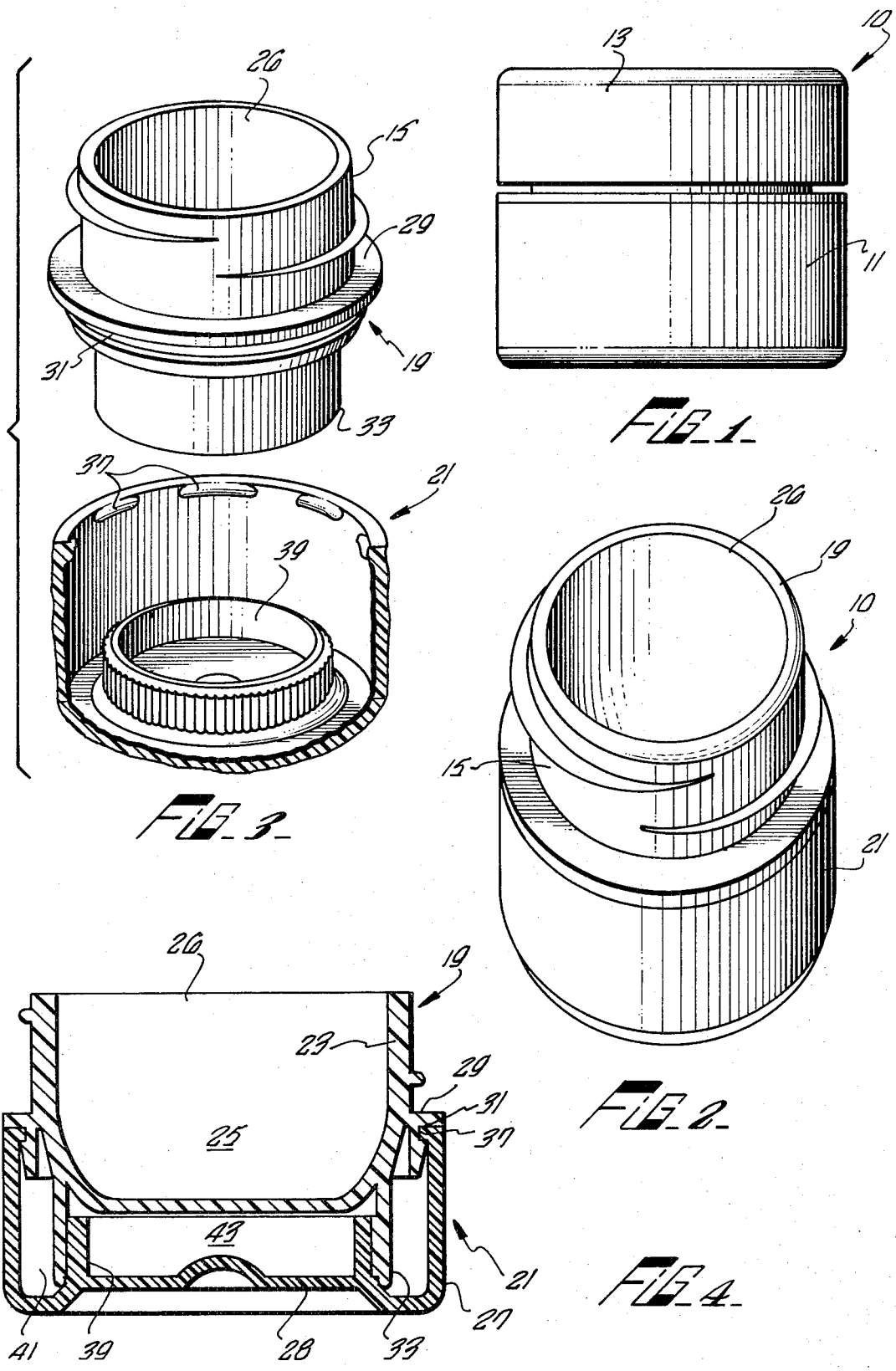
FIG_1_
FIG_2_
FIG_3_
FIG_4_

COUPLING MECHANISM FOR TUBULAR ELEMENTS

The present invention is a divisional application of Ser. No. 64,964 filed Aug. 19, 1970, now U.S. Pat. No. 3,650,427, issued on Mar. 21, 1972.

BACKGROUND OF THE INVENTION

1. Field of the Invention

The present invention relates to two piece coupling mechanism for packaging cosmetics and the like and more particularly to means for mechanically securing and locking the two pieces to form an integral unit.

2. Description of the Prior Art

One type of plastic coupling mechanism has been the two piece double walled container. The double wall construction, of course, provides the thermal air insulation necessary for the heat sensitive cosmetic formulations.

Such containers usually include two elements, an inner element and an outer insulative element. The inner element of the two piece construction forms the compartment for containing the cosmetics and is usually made of polypropylene. Such a material is preferred since it is chemically inert to a great majority of products used in cosmetics. The outer element of the container forming the insulative wall is usually made of styrene. The reason this material is preferred is because of its capability of being decoratively enhanced.

Although such plastic containers are currently being used, they all suffer from one serious shortcoming which has severely restricted their widespread utilization. This shortcoming is that, heretofore, no one has been able to satisfactorily unite the two elements securely and prevent them from being separated. Because the two elements are made of different materials it has been found that they can not be cemented together with adhesives.

As a result, these two elements are usually united by mechanical means. The coupling means usually comprise some type of snap-in arrangement in which a rim from one element is adapted to be snapped into engagement with a groove of the other element. However, this is unsatisfactory, since any pulling force on the two elements causes the coupling means to become disengaged and the two elements to separate. This, of course, is undesirable. Other coupling arrangements have been utilized, but none of them have sufficient strength to prevent the two elements from being separated when pulling forces were applied.

SUMMARY OF THE INVENTION

The present invention obviates the above mentioned shortcoming by providing a novel coupling arrangement for a two piece coupling mechanism which functions to prevent the two elements from being separated by the exertion of any outside pulling forces. The coupling mechanism utilizing the novel coupling arrangement comprises a first and second element. The first element is of a cup-shaped configuration having a cylindrical sidewall and a bottom wall forming a compartment therein for containing the cosmetics. The second element is also of a cup-shaped configuration having a cylindrical sidewall and a bottom wall of slightly larger dimensions in order to extend over the first element in a spaced relationship to form an insulative thermal air pocket therebetween. The coupling means comprises a double interengaging locking arrangement. The first interengaging means comprises a grooved annular collar formed on the periphery of the cylindrical wall of the first element. The rim of the cylindrical wall of the second element includes a plurality of projections extending inwardly therefrom for engaging the grooved collar of the first element. The second interengaging means comprises a tubular extension extending downwardly from the bottom wall of the first element and is adapted to extend over and snugly frictionally engage a tubular extension extending upwardly from the bottom wall of the second element. The interengaging tubular extensions are coaxially positioned with respect to the cylindrical walls of the elements. The tubular extension of the second element functions to be movable with its cylindrical and bottom walls to act as a load bearing member and to increase the frictional interengagement between the tubular extensions upon the application of any external loads to prevent the two elements from becoming separated. The interengaging surfaces of the tubular extensions are also splined in order to prevent any twisting of relative rotation between the two elements.

As a result of the novel coupling means of the present invention, a two piece coupling mechanism can now be easily assembled into a unitary article that can not be separated during use.

The features of the present invention which are believed to be novel are set forth with particularity in the appended claims.

The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 1 is a perspective view of the two piece coupling mechanism of the present invention;

FIG. 2 is a perspective view of the coupling mechanism;

FIG. 3 is an exploded view, partially broken away, of the two elements forming the coupling mechanism; and FIG. 4 is a sectional view of the two piece coupling mechanism taken along lines 4—4 of FIG. 3.

DESCRIPTION OF THE PREFERRED EMBODIMENT

Referring now to the drawings, FIGS. 1 and 2 show the overall outward appearance of a coupling mechanism, generally indicated by arrow 10, having a main body portion 11 and a cap member 13. The cap member 13 functions in a conventional manner by having an internal threaded surface which is adapted to be connected to a threaded cap receiving portion 15 of the main body member 11.

FIG. 3 shows an exploded view of the main body member 11 which comprises a first inner element 19 and a second outer element 21. Each element is of a molded unitary plastic construction with the element 19 preferably made of polypropylene, while the element 21 is preferably made of styrene. The first inner element 19 is of a cup-shaped configuration having a cylindrical wall 23 and a bottom wall 25 forming a compartment 26 for containing a quantity of cosmetics. The second outer element 21 is also of a cup-shaped configuration having a cylindrical wall 27 and a bottom wall 28 of larger dimensions to permit the second element 21 to extend over the first element 19 in a spaced relationship.

The cylindrical wall 23 further includes an annular flange 29 formed thereon having a groove 31 extending about the periphery thereof. The first element 19 also includes a tubular extension 33 extending downwardly from the bottom wall 25.

The second element 21 further includes a plurality of projections 37 extending inwardly about the rim of the cylindrical wall 27. The second element further includes a tubular extension 39 extending upwardly from the bottom wall 28.

As shown in FIG. 4, the plurality of projections 37 of the wall 27 are adapted to extend into and engage the groove 31 of the first element 19. This snap-in arrangement is possible because of the relative flexibility of the cylindrical wall 27. As also shown in FIG. 4, the tubular extension 39 is adapted to extend into and snugly engage the inner surface of the tubular extension 33 of the first element 19. It should also be noted that the interengaging surfaces are splined to prevent any relative rotation between the elements.

In this assembled form, the walls 23 and 27 of the first and second elements 19 and 21, respectively, are spaced from one another with the space therebetween forming a thermal air pocket 41. Likewise, because of the spacing caused by the tubular extensions 33 and 39, a bottom thermal air pocket 43 is formed between the bottom walls 25 and 28 of the respective elements 19 and 21. Such thermal air pockets function to insulate the cosmetic formulations in the compartment 26 from the atmosphere. It has been found that this type of insulated packaging is capable of protecting cosmetic formulations from heat ranging from above 110° to below 40°F.

The elements 19 and 21 can be easily united in the position shown in FIG. 4 by inserting the element 19 within element 21, mating the tubular extension 33 with tubular extension 39, and snapping the projections 37 into the groove 31. In its assembled configuration, the coupling means function to maintain the two elements 19 and 21 in an interlocked position and prevent them from separating. This is accomplished because any forces acting on the elements which would tend to cause them to separate would be absorbed mainly by the interengaging tubular extensions. For example, a bending force exerted on the element 21 in the clockwise direction on the device shown in FIG. 4 would tend to pull the right corner of the rim portion of the cylindrical wall 27 out of engagement with the groove 31. However, such a bending load acting on that corner would be transferred down the wall 27, across the bottom wall 28 and up the tubular extension 39, causing it to bend in the same direction. But instead of moving out of engagement, as the right hand corner does, the tubular extension 39 is forced into greater frictional engagement with the tubular extension 33. Moreover, if an axial load is applied to separate the elements 19 and 21, the entire rim of the element 21 would be forced outwardly to become disengaged with the groove 31. When this occurs, this outward flexing of the cylindrical wall 27 causes the bottom wall 28 to bow upwardly. This movement, in turn, causes the entire tubular extension 39 to flex outwardly in a radial direction to again increase the frictional engagement between the tubular extensions. As can be seen, no matter whether the force is a bending force or an axial force, such loads are absorbed by the interengaging tubular extensions and a load path is set up between the two elements. Because of the relative rigidity of the two elements, the load paths created are able to absorb very high loads without becoming disengaged. Usually the wall structure of the two elements will break before the coupling means would become disengaged. This, of course, exceeds by far the force requirements on the two elements. As a result, no matter how great the force, short of destroying the wall structure of the elements, the load bearing member will remain interengaged and not frictionally slip out of engagement. This, therefore, guarantees the two elements from becoming separated during use.

It should be noted that various modifications can be made to the apparatus while still remaining within the purview of the following claims. For example, the coupling mechanism can be made in any size. Moreover, because the outer element of the container is preferably made of styrene, this material can be easily formed to any desired shape and can be finished with any desired color or surface texture.

I claim:
1. A coupling mechanism for permanently coupling together a pair of tubular elements comprising:
a first element having an annular side wall with an annular groove on the outside surface thereof and a second element, the second element also having an annular side wall fitting over the first element side wall, the second element side wall further having an open end surrounding the first element and a flexible continuous closed end;
projection means on the second element extending radially inward and beyond the inside surface of the second element side wall surface to provide a snap-in engagement with the annular groove thereby providing a first securement point between the elements;
means for frictionally interengaging the first and second elements to provide a second securement point with at least two separate contact points between the elements comprising a first tubular splined extension member on the first element having an outside diameter at least slightly smaller than the inside diameter of the first element annular side wall and a second splined tubular extension member on the second element for frictional interengagement with the first tubular splined extension; and
means for increasing the frictional engagement between said splined tubular extension members upon the application of an external load including that portion of the continuous flexible closed end extending between said separate contact points that permits relative movement between the contact points when said external load tends to disengage said projecting means from the annular groove and tends to stress the second element comprising an annular truncated conical portion forming part of said closed end adjacent the second tubular extension member and engaging the end of said first tubular extension member when said projection means is in engagement with said annular groove whereby any relative movement between said contact points increases the frictional interengagement of the extension members beyond the physical strength of at least one element to thereby permanently bond the elements together.

2. The invention of claim 1 wherein the first element is made of polypropylene material and the second element is made of a styrene material.

3. The invention of claim 1 further including a flange on the first element having the same diameter as the outside surface of the second element for bearing against the second element.

4. The invention of claim 1 wherein the securement points are only held together by mechanical frictional interengagement.

* * * * *